(12) United States Patent
Sedouram et al.

(10) Patent No.: US 12,718,793 B2
(45) Date of Patent: Aug. 25, 2026

(54) SONIFYING VISUAL CONTENT FOR VISION-IMPAIRED USERS

(71) Applicant: Google LLC, Mountain View, CA (US)

(72) Inventors: Ramprasad Sedouram, Bangalore (IN); Jaunani Sriramachandran, Sammamish, WA (US)

(73) Assignee: Google LLC, Mountain View, CA (US)

( * ) Notice: Subject to any disclaimer, the term of this patent is extended or adjusted under 35 U.S.C. 154(b) by 196 days.

(21) Appl. No.: 18/482,100

(22) Filed: Oct. 6, 2023

(65) Prior Publication Data

US 2025/0118287 A1 Apr. 10, 2025

(51) Int. Cl.
*G10L 13/08* (2013.01)
*G06V 20/70* (2022.01)
*G10L 15/26* (2006.01)

(52) U.S. Cl.
CPC .............. *G10L 13/08* (2013.01); *G10L 15/26* (2013.01); *G06V 20/70* (2022.01)

(58) Field of Classification Search
CPC ....... G10L 13/08; G10L 15/26; G06V 10/764; G06V 10/82; G06V 20/70
USPC ......................................... 704/235, 260, 270
See application file for complete search history.

(56) References Cited

U.S. PATENT DOCUMENTS 6,956,573 B1 * 10/2005 Bergen ................. G11B 27/105 348/E7.071
12,283,291 B1 * 4/2025 Sarfati ............... H04N 21/8106
2007/0132767 A1 * 6/2007 Wright ................... G06V 20/52 345/475
2012/0151348 A1 * 6/2012 Mital ................ H04N 21/8541 715/764
2015/0312649 A1 * 10/2015 Gopalan .......... H04N 21/23418 725/32
2016/0225187 A1 * 8/2016 Knipp .................. G06F 40/131
2017/0229040 A1 8/2017 Joshi et al.
2019/0138598 A1 5/2019 Albouyeh et al.
2020/0278991 A1 * 9/2020 Canter .................. G06F 40/166
2020/0349387 A1 * 11/2020 Krishnamurthy ...... G06V 10/82
2021/0321172 A1 * 10/2021 Krishnamurthy .... G06N 3/0464
2022/0147558 A1 * 5/2022 Steffensen ............. G11B 27/28
2022/0157300 A1 * 5/2022 Sharifi .................... G10L 15/26
2022/0253715 A1 * 8/2022 Ray ........................ G06N 3/088

(Continued)

FOREIGN PATENT DOCUMENTS

JP 2003203242 A * 7/2003

OTHER PUBLICATIONS

A New Image Captioning Approach for Visually Impaired People, Kilic et al. Feb. 13, 2020.

(Continued)

*Primary Examiner* — James S Wozniak
(74) *Attorney, Agent, or Firm* — Honigman LLP; Brett A. Krueger; Grant Griffith

(57) ABSTRACT

A method includes receiving, for presentation to a user of a user device, image data representing an image. The method also includes generating, using a textual story generative model, based on the image data, a textual story for the image, and generating, based on the textual story for the image, textual story audio data representing the textual story for the image. The method further includes providing, for audible output from the user device, the textual story audio data.

16 Claims, 5 Drawing Sheets

(56) References Cited

U.S. PATENT DOCUMENTS

| | | | | |
|---|---|---|---|---|
| 2023/0104683 | A1* | 4/2023 | Recker | H04R 25/609<br>381/312 |
| 2024/0013768 | A1* | 1/2024 | Mossoba | G09B 21/006 |
| 2024/0177728 | A1* | 5/2024 | Palaniappan | G06F 40/30 |
| 2024/0380949 | A1* | 11/2024 | Yang | H04N 21/23892 |
| 2025/0036356 | A1* | 1/2025 | Hillborg | G06V 20/46 |
| 2025/0077171 | A1* | 3/2025 | Phills | G06F 3/167 |

OTHER PUBLICATIONS

Using AI to Give People Who Are Blind the “Full Picture” Dominic Mazzoni, Oct. 11, 2019.

Kajihara Yuma et al: “Imaginary Soundscape: Cross-Modal Approach to Generate Pseudo Sound Environments”, Proceedings of the Workshop on Machine Learning for Creativity and Design (NIPS 2017), Long Beach, CA, USA, Dec. 8, 2017 (Dec. 8, 2017), pp. 1-3, XP093226707.

International Search Report and Written Opinion issued in related PCT Application No. PCT/US2024/048182, dated Dec. 2, 2024.

* cited by examiner

SONIFYING VISUAL CONTENT FOR VISION-IMPAIRED USERS

TECHNICAL FIELD

This disclosure relates to sonifying visual content for vision-impaired users.

BACKGROUND

Increasingly, vision-impaired users are using screen readers to access digital visual content. Screen readers have become an essential tool for vision-impaired users. Non-impaired users may also use screen readers for convenience or other purposes.

SUMMARY

One aspect of the disclosure provides a computer-implemented method for sonifying visual imagery for vision-impaired users. The computer-implemented method, when executed on data processing hardware, causes the data processing hardware to perform operations including receiving, for presentation to a user of a user device, image data representing an image, and generating, using a textual story generative model, based on the image data, a textual story for the image. The operations also include generating, based on the textual story for the image, textual story audio data representing the textual story for the image, and providing, for audible output from the user device, the textual story audio data.

Implementations of the disclosure may include one or more of the following optional features. In some implementations, the operations include generating, based on the image data, a soundscape for the image, generating, based on the soundscape for the image, soundscape audio data representing the soundscape for the image, and providing, for audible output from the user device, the soundscape audio data. In some examples, the operations include generating the soundscape for the image based on the textual story for the image. In some implementations, generating, based on the image data, the soundscape for the image includes processing, using a visual feature identification model, the image data to generate a description of the image, identifying, from a repository of images each paired with corresponding audio representing a visual environment of the image and a corresponding description of the image, one or more of the images that are paired with corresponding descriptions that match the description of the image, and generating, using a soundscape generative model, based on the corresponding audio representing the visual environment of the identified one or more images, the soundscape audio data. In some examples, providing the soundscape audio data includes providing the soundscape audio data and the textual story audio data for audible output from the user device simultaneously.

In some examples, the operations include generating, using a natural language processing model, based on the image data, a meaning of the image, and generating the textual story for the image is further based on the meaning of the image. In some implementations, the operations include obtaining one or more personal factors associated with the user, and customizing the textual story for the image based on the one or more personal factors. The one or more personal factors associated with the user may include at least one of a user preference, past media consumed by the user, a contact in a contact list of the user, a personal history of the user, a location history of the user, a elaborateness preference for textual stories and soundscapes, a current location of the user, or a current activity of the user.

In some implementations, the operations include receiving, for presentation to the user of the user device, text representing the textual story, converting, using a text-to-speech (TTS) system, the text into TTS audio data that conveys the text as synthetic speech, and providing, for output from the user device, the TTS audio data. In some examples, generating, using the textual story generative model, the textual story for the image is further based on text extracted from the image data. In some implementations, generating the textual story audio data includes converting, using a text-to-speech (TTS) system, the textual story into TTS audio data that conveys the textual story in a synthetic voice, the textual story audio data includes the TTS audio data.

Another aspect of the disclosure provides a system including data processing hardware, and memory hardware in communication with the data processing hardware and storing instructions that, when executed on the data processing hardware, causes the data processing hardware to perform operations. The operations including receiving, for presentation to a user of a user device, image data representing an image, and generating, using a textual story generative model, based on the image data, a textual story for the image. The operations also include generating, based on the textual story for the image, textual story audio data representing the textual story for the image, and providing, for audible output from the user device, the textual story audio data.

Implementations of the disclosure may include one or more of the following optional features. In some implementations, the operations include generating, based on the image data, a soundscape for the image, generating, based on the soundscape for the image, soundscape audio data representing the soundscape for the image, and providing, for audible output from the user device, the soundscape audio data. In some examples, the operations include generating the soundscape for the image based on the textual story for the image. In some implementations, generating, based on the image data, the soundscape for the image includes processing, using a visual feature identification model, the image data to generate a description of the image, identifying, from a repository of images each paired with corresponding audio representing a visual environment of the image and a corresponding description of the image, one or more of the images that are paired with corresponding descriptions that match the description of the image, and generating, using a soundscape generative model, based on the corresponding audio representing the visual environment of the identified one or more images, the soundscape audio data. In some examples, providing the soundscape audio data includes providing the soundscape audio data and the textual story audio data for audible output from the user device simultaneously.

In some examples, the operations include generating, using a natural language processing model, based on the image data, a meaning of the image, and generating the textual story for the image is further based on the meaning of the image. In some implementations, the operations include obtaining one or more personal factors associated with the user, and customizing the textual story for the image based on the one or more personal factors. The one or more personal factors associated with the user may include at least one of a user preference, past media consumed by the user, a contact in a contact list of the user, a personal history of the user, a location history of the user, a elaborateness preference for textual stories and soundscapes, a current location of the user, or a current activity of the user.

In some implementations, the operations include receiving, for presentation to the user of the user device, text representing the textual story, converting, using a text-to-speech (TTS) system, the text into TTS audio data that conveys the text as synthetic speech, and providing, for output from the user device, the TTS audio data. In some examples, generating, using the textual story generative model, the textual story for the image is further based on text extracted from the image data. In some implementations, generating the textual story audio data includes converting, using a text-to-speech (TTS) system, the textual story into TTS audio data that conveys the textual story in a synthetic voice, the textual story audio data includes the TTS audio data.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Increasingly, vision-impaired users are using screen readers to access digital visual content. Screen readers have become an essential tool for vision-impaired users. Non-impaired users may also use screen readers for convenience, entertainment, or other purposes. However, visual content often contains visual information (e.g., images) that conventional screen readers may be unable to fully process and/or present in a way that is easy for a user to understand. As used herein, visual content includes images and video (referred to simply herein as images) with or without corresponding audio content or text. An example of visual content includes a webpage including images and text (some of which may be embedded). Understanding images may be very important to fully understanding the overall meaning of visual content. For example, factually describing an image of a nature scene as "natural scenery" omits many descriptive details such as mountains, sky, snow, kits, trees, etc., or other features contained in the image that may be relevant or of interest to a user. Moreover, images may be used in various ways on websites and in other digital content. For example, images may be used to illustrate a point, to provide additional information, or to create a more visually appealing experience. Conventional screen readers may not be able to distinguish between these different uses of images, which may make it difficult for a conventional screen reader to convey to a user the meaning or purpose of an image. These challenges can make it difficult for vision-impaired users to access and understand visual content that includes an image. Therefore, there is a need for systems and methods for sonifying visual content for vision-impaired users and non-impaired users. Systems and methods disclosed herein can revolutionize how vision-impaired users experience visual content by translating images into creative audible stories that create experiences that are sonically immersive and engaging. In examples, sonification of visual content may bring an image to life such that a user may feel like they are experiencing what the image conveys. Additionally, by mimicking soundscapes, disclosed examples can create experiences that are more realistic and believable even to a non-impaired user as well as enabling them to consume images visually along with audible cues.

Figure 1:
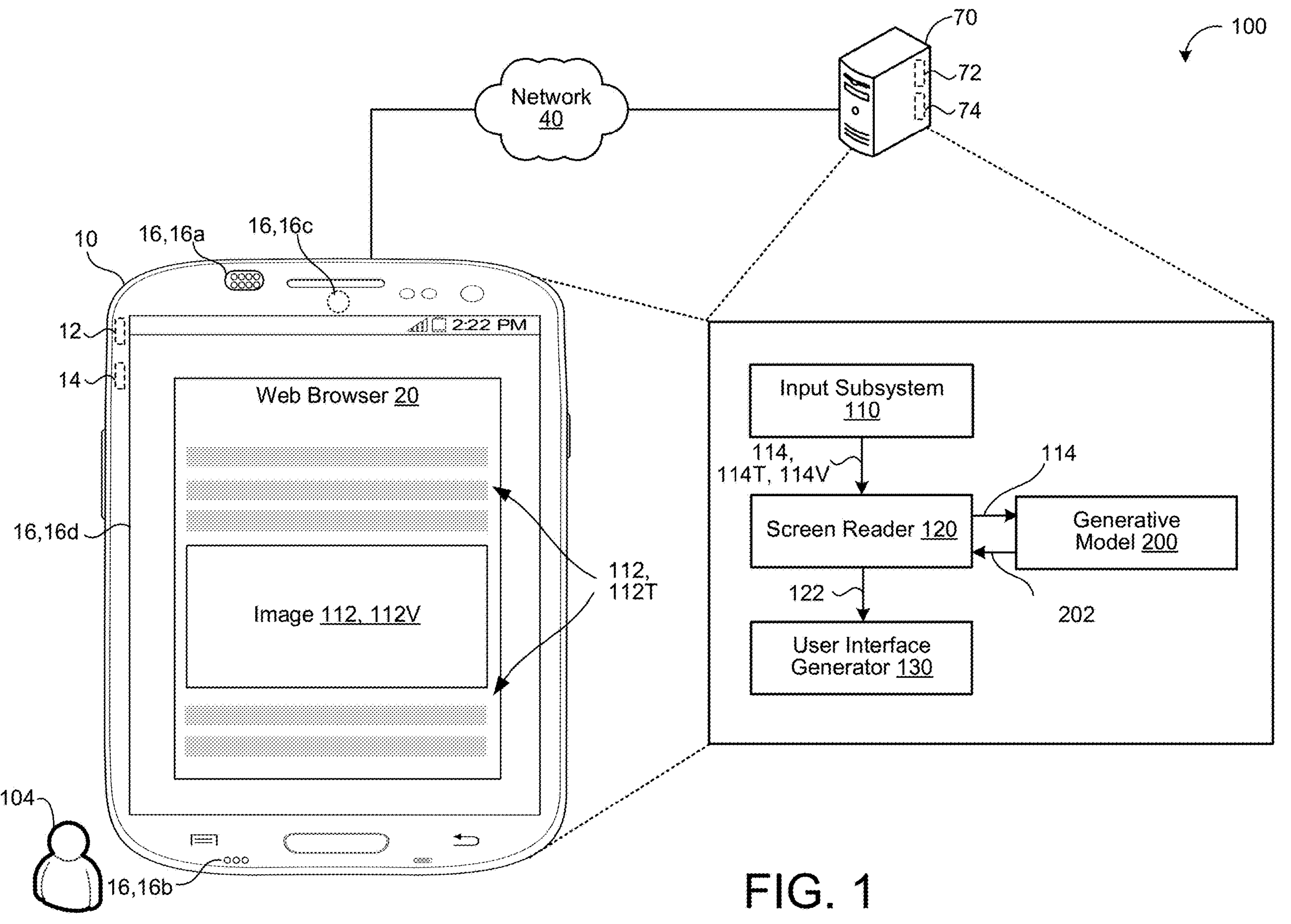
FIG. 1 is a schematic view of an example system using a generative model for sonifying visual content.

FIG. 1 is a schematic view of an example of a system 100 using a generative model 200 for sonifying visual content 112 presented on a display 16, **16*d* of a user device 10. In this example, the visual content 112 includes one or more images 112V, 112Va-n together with text 112T, 112Ta-n. For clarity of explanation, this disclosure will refer to the visual content 112 has having a single image 112V, however, one should understand that this disclosure equally applies to visual content 112 having more than one image 112V. When multiple images 112V are present, disclosed examples may sonify them individually or together in a single sonification. Here, sonifying the visual content 112 refers to generating and providing, for audible output by an audio output device 16, 16*b* of the user device 10, audio data 122 that audibly represents the image 112V and/or the text 112T to a user 104 of the user device 10. In some instances, the user 104 is visually impaired. The audio data 122 represents a textual story 222 (see FIG. 2) for the image 112V and/or a soundscape 232 (see FIG. 2) for the image 112V. In the illustrated example, the image 112V and/or the text 112T is online content accessed in a web browser 20 executing on the user device 10. Additionally or alternatively, the image 112V and/or the text 112T may be captured using a camera 16, 16*c*, displayed in smart glasses, smart goggles, an augmented reality (AR) headset, or a virtual reality (VR) headset, and/or may be content stored in memory hardware 14 on the user device 10. Examples of an image 112V include, but are not limited to, a picture, a sketch, an illustration, and a drawings. In some examples, a portion of the text 112T represents a description of a corresponding image 112**V.

The user device 10 may correspond to any computing device associated with a user 104 and capable of capturing images 112V and text 112T, and providing audible outputs. Some examples of user devices 10 include, but are not limited to, mobile devices (e.g., mobile phones, tablets, laptops, etc.), computers, wearable devices (e.g., a smart watch, smart glasses, smart goggles, an AR headset, a VR headset, etc.), smart appliances, Internet of things (IoT) devices, vehicle infotainment systems, smart displays, smart speakers, etc. The user device 10 includes data processing hardware 12 and memory hardware 14 in communication with the data processing hardware 12 and stores instructions, that when executed by the data processing hardware 12, cause the data processing hardware 12 to perform one or more operations. The user device 10 further includes one or more input/output devices 16, **16*a-n*, such as an audio capture device 16, 16*a* (e.g., microphone) for capturing and converting spoken utterances 106 into electrical signals, the audio output device 16, 16*b* (e.g., a speaker) for communicating an audible audio signal (e.g., as output audio data from the user device 10), the camera 16, 16*c* for capturing images or video, and/or the display 16, 16***d* for displaying the visual content 112. Of course, any number and/or type(s) of other input/output devices 16 may be used. The input/output devices 16 may reside on or be in communication with the user device 10.

The user device 10 and/or a remote computing device 70 (e.g., one or more remote servers of a distributed system executing in a cloud-computing environment) in communication with the user device 10 via a network 40 executes an input subsystem 110 configured to receive visual content 112 (e.g., an image 112V with text 112T), captured by the input/output devices 16, and to convert the visual content 112 into data 114 representing the visual content 112 and capable of being processed by a screen reader 120 and/or a generative model 200. Here, the data 114 includes image data 114, 114V representing images 112V, and text data 114, 114T representing text 112T. The remote computing device 70 includes data processing hardware 72, and memory hardware 74 in communication with the data processing hardware 72. The memory hardware 74 stores instructions that, when executed by the data processing hardware 72, cause the data processing hardware 72 to perform one or more operations, such as those disclosed herein.

The screen reader 120 may reside on the user device 10 of the user 104 and/or on the remote computing device 70. The screen reader 120 is configured to receive, for presentation to the user 104 of the user device 10, text data 114T, and convert, using a text-to-speech (TTS) system, the text data 114T into TTS audio data 122 that conveys the text data 114T as synthetic speech in a synthetic voice. Here, the audio data 122 may include spectrograms, and/or a time sequence of audio waveform data representing the synthetic speech.

The generative model 200 may reside on the user device 10 of the user 104 and/or on the remote computing device 70. The generative model 200 is configured to receive, for presentation to the user 104 of the user device 10, image data 114V representing an image 112V, and to generate, based on image data 114V, a textual story 222 (see FIG. 2) for the image 112V. In some examples, the generative model 200 also generates, based on the image data 114V, a soundscape 234 (see FIG. 2) for the image 112V. The generative model 200 generates and outputs audio data 202 representing the textual story 222 and/or the soundscape 234. In some examples, the audio data 202 represents the simultaneous audible output of the textual story 222 and the soundscape 234 from the user device 10. Here, the audio data 202 may include spectrograms, and/or a time sequence of audio waveform data representing the textual story 222 and/or the soundscape 234.

In some examples, the screen reader 120 combines the audio data 202 generated and output by the generative model 200 with TTS audio data generated by the screen reader 120 as the output data 122. This may allow the screen reader 120 to coordinate timings of the audible output of the TTS audio conveying the text 112T with the audible output of the textual stories 222 and/or soundscapes 234 for the image 112V such that they do, or do not, overlap in time.

The user device 10 and/or the remote computing device 70 also executes a user interface generator 130 configured to provide, for audible output from the audio output device 16*b* of the user device 10, the audio data 122 generated by the screen reader 120 and/or the audio data 202 generated by the generative model 200. In some examples, the audio data 122, 202 includes spectrograms that the user interface generator 130 decodes to generate a time sequence of audio waveform data that can be output by the audio output device 16*b*. Additionally or alternatively, the audio data 122, 202 includes a time sequence of audio waveform data.

An example operation of the user device 10, the screen reader 120, and the generative model 200 starts with a user, Bob, using the screen reader 120 on the user device 10 to consume an article about a railway station in India. The screen reader 120 outputs TTS audio data 122 representing text 112T of the article. For example, the user device 10 may output audio representing "The Royapuram railway station in Chennai is India's oldest surviving railway station. This station is still functional even as it enters its 167th year." Then, when an image of the railway station (e.g., see FIG. 3) is detected by the screen reader 120, the user device 10 may output audio representing "I have identified an image in the article as a railway station in India. I will now generate a soundscape of the station for you." The generative model 200 generates, and the user interface generator 130 outputs, a soundscape of a typical railway station in India including the sounds of trains arriving and departing, people talking and laughing, and food being cooked, and describing that "sweat and grime fill the air." Bob, whose may be smiling, remarks "This is amazing! It's like I'm really there." In some examples, if Bob is a user who likes soundscapes and/or longer textual stories, the generative model 200 may generate a longer textual story such as "The image in the article shows a busy railway station in India. The station is crowded with people, and there are trains arriving and departing. The sounds of the station are a cacophony of noise, from the trains to the people talking and laughing. The smells of the station are also a sensory overload, from the food being cooked to the sweat and grime of the people." For a user such as Bob, they may feel as if and express that "This is the most immersive experience I've ever had with an image. Thank you, Google"

Figure 2:
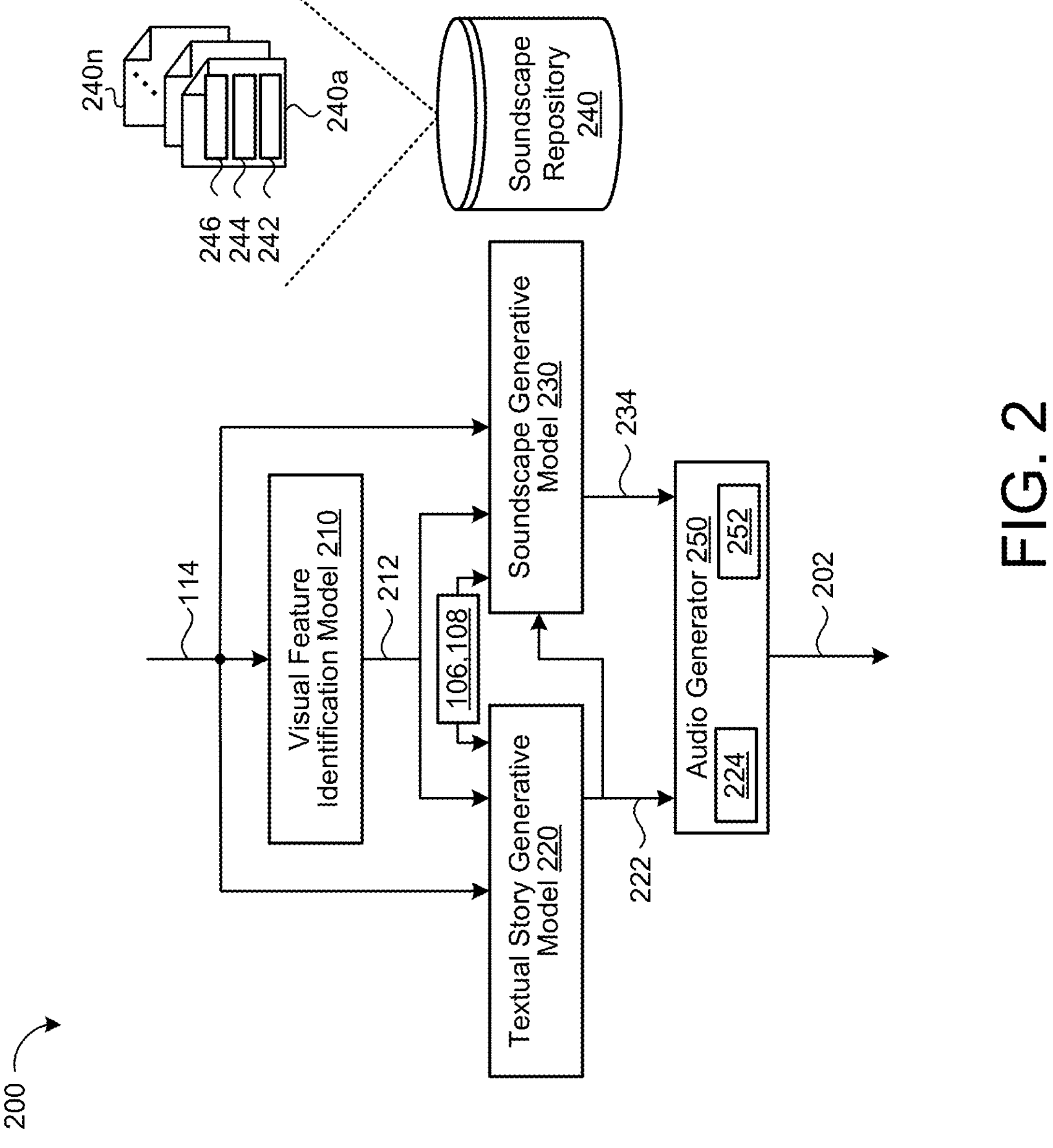
FIG. 2 is a schematic view of an example generative model for sonifying visual content.
Figure 3:
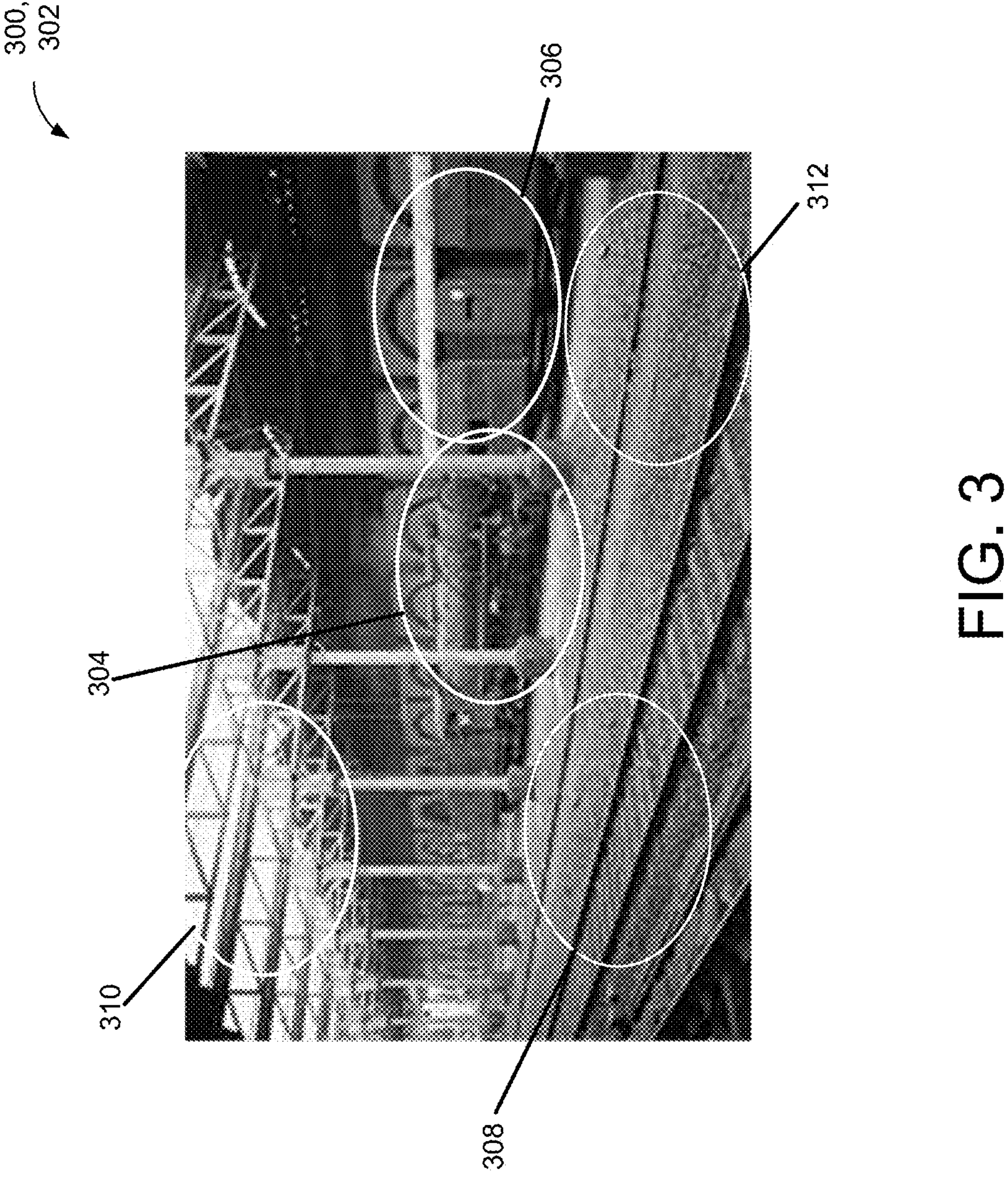
FIG. 3 is an example of a visual image.

FIG. 2 is a schematic view of an example of a generative model 200. The generative model 200 executes a visual feature identification model 210 configured to process image data 114V representing an image 112V to generate a description 212 of the image 112V. Here, the description 212 of an image 112V may include, but is not limited to, a list of elements, aspects, features, etc. identified in the image 112V, and a meaning of the image 112V. In some implementations, the visual feature identification model 210 executes a natural language processing (NPL) model to determine the meaning of the image 112V, and a trained machine learning (ML) model to identify elements, aspects, features, etc. in the image 112V. In some examples, the visual features identification model 210 also processes text data 114T representing text 112T corresponding to, or near by, the image 112V in the visual content 112 while generating the description 212 of the image 112V. FIG. 3 is an image 300 of a train station 302. In the example shown, the visual feature identification model 210 has identified a locomotive 304, a train car 306, an empty train track 308, an open ceiling 310 through which light is streaming, and a ground surface 312 covered in broken stone.

Returning to FIG. 2, the generative model 200 executes a textual story generative model 220 configured to receive the image data 114V representing an image 112V, and generating, based on the image data 114V, a textual story 222, 222*a-n* for the image 112V. In some examples, the textual story generative model 220 generates the textual story 222 based on the image data 114V, the description 212 generated by the visual feature identification model 210 for the image 112V, and text data 114T representing text 112T corresponding to, or near by, the image 112V in the visual content 112. Here, the description 212 may include a meaning 212 of the image 112V. In some implementations, the textual story generative model 220 obtains one or more personal factors associated with the user 104, and customizes the textual story 222 based on the one or more personal factors 106 associated with the user 104. Example personal factors 106 include, but are not limited to, a user preference, past media consumed by the user 104, a contact in a contact list of the user 104, a location history of the user 104, a current location of the user 104, the user's personal history, a elaborateness preference for textual stories and soundscapes, and a current activity of the user 104. In some implementations, the textual story generative model 220 obtains one or more content provider factors 108 associated with a provider of the content 112, and customizes the textual story 222 based on the one or more content provider factors. In some examples, the textual story generative model 220 includes a trained ML model. In some instances, image data 114V conveys embedded text that represents descriptive content for the image 112V. Alternatively, text may visually appear in or on the image 112V. Here, the textual story generative model 220 may extract, from the image data 114V, such text, and include the extracted text as part of the textual story 222.

The generative model 200 executes a soundscape generative model 230 for receiving image data 114V representing an image 112V, and generating, based on the image data 114V, soundscape audio data 234 representing a soundscape for the image 112V. In some examples, the soundscape generative model 230 also generates the soundscape audio data 234 for the image 112V based on the textual story 222 for the image 112V and/or the description 212 for the image 112V. In particular, the soundscape generative model 230 may identify, from a repository 240, 240*a-n* of reference images 242, 242*a-n* (each paired with corresponding reference audio 244, 244*a-n* representing a visual environment of the reference image 242 and a corresponding description 246 of the image), one or more of the images 242 that are paired with corresponding descriptions 246 that match the description 212 of the image 112V. In some examples, the repository 240 includes examples of audio and/or video recordings that match a visual environment that is similar to the image 112V, and/or generated and/or synthesized audio that culturally and/or contextually matches those of the image 112V, a user's personal factors 106, and/or a content provider's factors 108. The soundscape generative model 230 then generates, based on the corresponding reference audio 244 representing the visual environment of the identified one or more reference images 242, soundscape audio data 234 for the image 112V. In some examples, the soundscape generative model 230 includes a trained ML model. Here, the ML model may be trained by providing audio representing the visual environment for the matching reference images 242 as few-shot learning examples for fine-tuning the ML model for generating the soundscape audio data 234.

The generative model 200 also executes an audio generator 250 for converting, using a TTS system 252, the textual story 222 for the image 112V into textual story audio data 224 that conveys the textual story 222 in a synthetic voice. The audio generator 250 combines or mixes the textual story audio data 224 with the soundscape audio data 234 to generate the audio data 202. In some examples, the audio data 202 represents the simultaneous audible output of the textual story audio data 224 and the soundscape audio data 234 from the user device 10. In some examples, the audio data 202 includes spectrograms that the user interface generator 130 may decode to generate a time sequence of audio waveform data that can be output by the audio output device 16*b*. Additionally or alternatively, the audio data 202 includes a time sequence of audio waveform data.

In the illustrated example, the textual story generative model 220 generates a textual story 222 that is converted to synthesized textual story audio data 224 by the audio generator 250. Additionally or alternatively, the textual story generative model 220 may generate the synthesized textual story audio data 224 directly without generating a textual story that must then be converted to synthesized speech. Moreover, while the visual feature identification model 210, the textual story generative model 220, and the soundscape generative model 230 are shown separately in FIG. 2, they may be combined and/or rearranged into fewer models.

Figure 4:
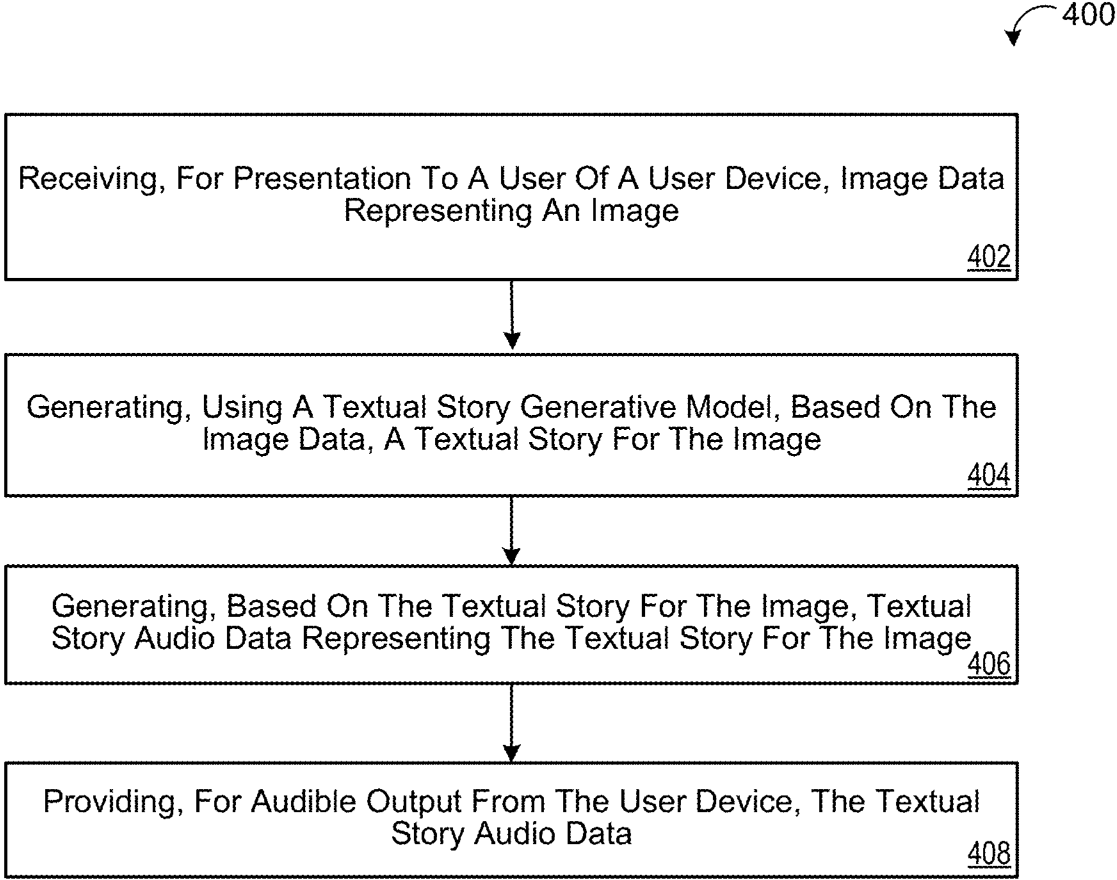
FIG. 4 is a flowchart of an example arrangement of operations for a computer-implemented method of sonifying visual content.

FIG. 4 is a flowchart of an exemplary arrangement of operations for a computer-implemented method 400 of sonifying visual content. The operations may be performed by data processing hardware 510 (FIG. 5) (e.g., the data processing hardware 12 of the user device 10 or the data processing hardware 72 of the remote computing device 70) based on executing instructions stored on memory hardware 520 (e.g., the memory hardware 14 of the user device 10 or the memory hardware 74 of the remote computing device 70).

At operation 402, the method 400 includes receiving, for presentation to a user 104 of a user device 10, image data 114V representing an image 112V. At operation 404, the method 400 includes generating, using a textual story generative model 220, based on the image data 114V, a textual story 222 for the image 112V. The method 400 includes, at operation 406, generating, based on the textual story 222 for the image 112V, textual story audio data 224, 202 representing the textual story 222 for the image 112V. At operation 408, the method 400 includes providing, for audible output from the user device 10, the textual story audio data 224, 202.

Figure 5:
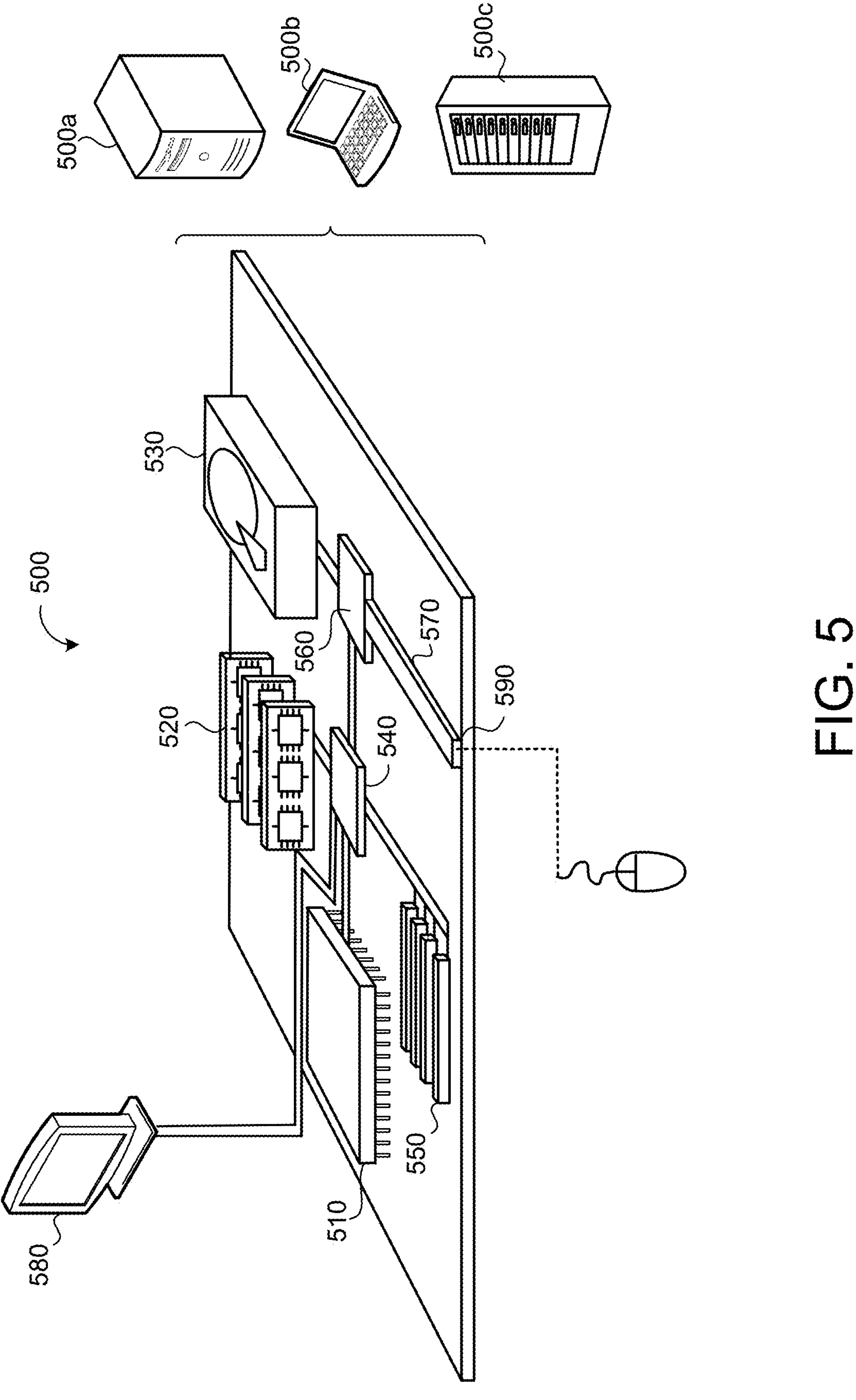
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (i.e., data processing hardware) that can be used to implement the data processing hardware 12 and/or 72, memory 520 (i.e., memory hardware) that can be used to implement the memory hardware 14 and/or 74, a storage device 530 (i.e., memory hardware) that can be used to implement the memory hardware 14 and/or 74, a high-speed interface/controller 540 connecting to the memory 520 and high-speed expansion ports 550, and a low speed interface/controller 560 connecting to a low speed bus 570 and a storage device 530 that can be used to implement the repository 240. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500*a* or multiple times in a group of such servers 500*a*, as a laptop computer 500*b*, or as part of a rack server system 500*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Unless expressly stated to the contrary, the phrase "at least one of A, B, or C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least C; and (7) at least one A with at least one B and at least one C. Moreover, unless expressly stated to the contrary, the phrase "at least one of A, B, and C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least one C; and (7) at least one A with at least one B and at least one C. Furthermore, unless expressly stated to the contrary, "A or B" is intended to refer to any combination of A and B, such as: (1) A alone; (2) B alone; and (3) A and B.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:

receiving, for presentation to a user of a user device, image data representing an image;

obtaining one or more personal factors associated with the user, the one or more personal factors comprising an elaborateness preference for textual stories and soundscapes;

generating, using a textual story generative model, based on the image data and the one or more personal factors, a textual story for the image;

generating, based on the textual story for the image, textual story audio data representing the textual story for the image;

generating, based on the image data, a soundscape for the image by:

processing, using a visual feature identification model, the image data to generate a description of the image;

identifying, from a repository of images each paired with corresponding audio representing a visual environment of the image and a corresponding description of the image, one or more of the images that are paired with corresponding descriptions that match the description of the image; and generating, using a soundscape generative model, based on the corresponding audio representing the visual environment of the identified one or more images, the soundscape audio data;

generating, based on the soundscape for the image, soundscape audio data representing the soundscape for the image; and providing, for audible output from the user device, the textual story audio data and the soundscape audio data.

2. The computer-implemented method of claim 1, wherein the operations further comprise generating the soundscape for the image based on the textual story for the image.

3. The computer-implemented method of claim 1, wherein providing the soundscape audio data comprises providing the soundscape audio data and the textual story audio data for audible output from the user device simultaneously.

4. The computer-implemented method of claim 1, wherein:

the operations further comprise generating, using a natural language processing model, based on the image data, a meaning of the image; and generating the textual story for the image is further based on the meaning of the image.

5. The computer-implemented method of claim 1, wherein the one or more personal factors associated with the user further comprise at least one of a user preference, past media consumed by the user, a contact in a contact list of the user, a personal history of the user, a location history of the user, a current location of the user, or a current activity of the user.

6. The computer-implemented method of claim 1, wherein the operations further comprise:

receiving, for presentation to the user of the user device, text data representing text;

converting, using a text-to-speech (TTS) system, the text data into TTS audio data that conveys the text as synthetic speech; and providing, for output from the user device, the TTS audio data.

7. The computer-implemented method of claim 1, wherein generating, using the textual story generative model, the textual story for the image is further based on text extracted from the image data.

8. The computer-implemented method of claim 1, wherein generating the textual story audio data comprises converting, using a text-to-speech (TTS) system, the textual story into TTS audio data that conveys the textual story in a synthetic voice, the textual story audio data comprising the TTS audio data.

9. A system comprising:

data processing hardware; and memory hardware in communication with the data processing hardware, the memory hardware storing instructions that when executed on the data processing hardware cause the data processing hardware to perform operations comprising:

receiving, for presentation to a user of a user device, image data representing an image;

obtaining one or more personal factors associated with the user, the one or more personal factors comprising an elaborateness preference for textual stories and soundscapes;

generating, using a textual story generative model, based on the image data and the one or more personal factors, a textual story for the image;

generating, based on the textual story for the image, textual story audio data representing the textual story for the image;

generating, based on the image data, a soundscape for the image by:

processing, using a visual feature identification model, the image data to generate a description of the image;

identifying, from a repository of images each paired with corresponding audio representing a visual environment of the image and a corresponding description of the image, one or more of the images that are paired with corresponding descriptions that match the description of the image; and generating, using a soundscape generative model, based on the corresponding audio representing the visual environment of the identified one or more images, the soundscape audio data;

generating, based on the soundscape for the image, soundscape audio data representing the soundscape for the image; and providing, for audible output from the user device, the textual story audio data and the soundscape audio data.

10. The system of claim 9, wherein the operations further comprise generating the soundscape for the image based on the textual story for the image.

11. The system of claim 9, wherein providing the soundscape audio data comprises providing the soundscape audio data and the textual story audio data for audible output from the user device simultaneously.

12. The system of claim 9, wherein:

the operations further comprise generating, using a natural language processing model, based on the image data, a meaning of the image; and generating the textual story for the image is further based on the meaning of the image.

13. The system of claim 9, wherein the one or more personal factors associated with the user further comprise at least one of a user preference, past media consumed by the user, a contact in a contact list of the user, a personal history of the user, a location history of the user, a current location of the user, or a current activity of the user.

14. The system of claim 9, wherein the operations further comprise:

receiving, for presentation to the user of the user device, text data representing text;

converting, using a text-to-speech (TTS) system, the text data into TTS audio that conveys the text as synthetic speech; and providing, for output from the user device, the TTS audio.

15. The system of claim 9, wherein generating, using the textual story generative model, the textual story for the image is further based on text extracted from the image data.

16. The system of claim 9, wherein generating the textual story audio data comprises converting, using a text-to-speech (TTS) system, the textual story into TTS audio data that conveys the textual story in a synthetic voice, the textual story audio data comprising the TTS audio data.

* * * * *